United States Patent [19]
Drain

[11] 4,180,328
[45] Dec. 25, 1979

[54] INTERFEROMETER WHICH CORRECTS FOR SPURIOUS VIBRATIONS

[75] Inventor: Leslie E. Drain, Goring-on-Thames, England

[73] Assignee: United Kingdom Atomic Energy Authority, London, England

[21] Appl. No.: 949,567

[22] Filed: Oct. 10, 1978

Related U.S. Application Data

[63] Continuation of Ser. No. 708,385, Jul. 6, 1976, abandoned.

[51] Int. Cl.² .............................................. G01B 9/02
[52] U.S. Cl. .................... 356/349; 356/358; 73/657; 356/351
[58] Field of Search ................ 73/657; 356/349, 358, 356/351

[56] References Cited

U.S. PATENT DOCUMENTS

| | | | |
|---|---|---|---|
| 3,482,436 | 12/1969 | Neish et al. | 73/657 |
| 3,622,794 | 11/1971 | Pond et al. | 356/349 |
| 3,632,214 | 1/1972 | Chang | 356/351 |
| 4,027,949 | 6/1977 | Lobb | 350/150 |

*Primary Examiner*—Conrad J. Clark
*Attorney, Agent, or Firm*—Larson, Taylor and Hinds

[57] ABSTRACT

An interferometer which is compensated for the effects of low frequency vibrations in the measuring arm. The resultant changes in optical path length are detected and control signals are applied to an electro-optical device adapted to change the phase of the light in the reference arm of the interferometer relative to that in the measuring arm of the interterometer so as to compensate for the changes of optical path length in the measuring arm of the interferometer.

21 Claims, 3 Drawing Figures

INTERFEROMETER WHICH CORRECTS FOR SPURIOUS VIBRATIONS

This is a continuation of application Ser. No. 708,385, filed July 26, 1976 now abandoned.

The present invention relates to interferometers, that is to devices in which light from a source is divided into two or more coherent beams which subsequently are reunited having traversed differing optical paths. In this context the term light embraces electro-magnetic radiation from regions of the spectrum other than the optical region.

Interferometers can be used to detect and measure vibrations in objects or structures by utilising light reflected from or scattered by the object or structure to form one arm, known as the measuring arm, of the interferometer. A problem which arises in the measurement of small ultrasonic vibrations is that, unless elaborate precautions are taken spurious low frequency vibrations are present that produce erratic path length charges in the measuring arm of the interferometer which interfere with the measurement of the high frequency low amplitude vibrations.

According to the present invention there is provided an interferometer having a reference arm and a measuring arm wherein there is included a control loop comprising means for detecting variations in the optical path length of the measuring arm and means for producing an intermediate electrical signal representative of variations in the optical path length of the measuring arm having a predetermined frequency characteristic, means for deriving control signals from the intermediate signal and an electro-optical device responsive to the control signals to change the phase of the light in the reference arm relative to that of the light in the measuring arm in a manner such as to compensate for the said vibrations in the optical path length of the measuring arm.

The electro-optical device for changing the phase of the light in the reference arm relative to that in the measuring arm may comprise a plurality of electro-optical units positioned sequentially with their axes inclined at 45° to each other and excited by alternating voltages each of which is 90° out of phase compared with that applied to adjacent electro-optical units.

The term electro-optical unit means a unit the optical activity of which can be varied by means of electric fields applied to the unit.

A preferred form of electro-optical device consists of two Kerr cells contained in a common envelope. Alternatively, Pockel cells can be used.

The frequency of the alternating voltages is determined by measuring the rate at which the interferometer initially changes between the in-and out-of-balance condition, before the control loop becomes effective.

The invention will be described, by way of example, with reference to the accompanying drawings in which.

Figure 1:
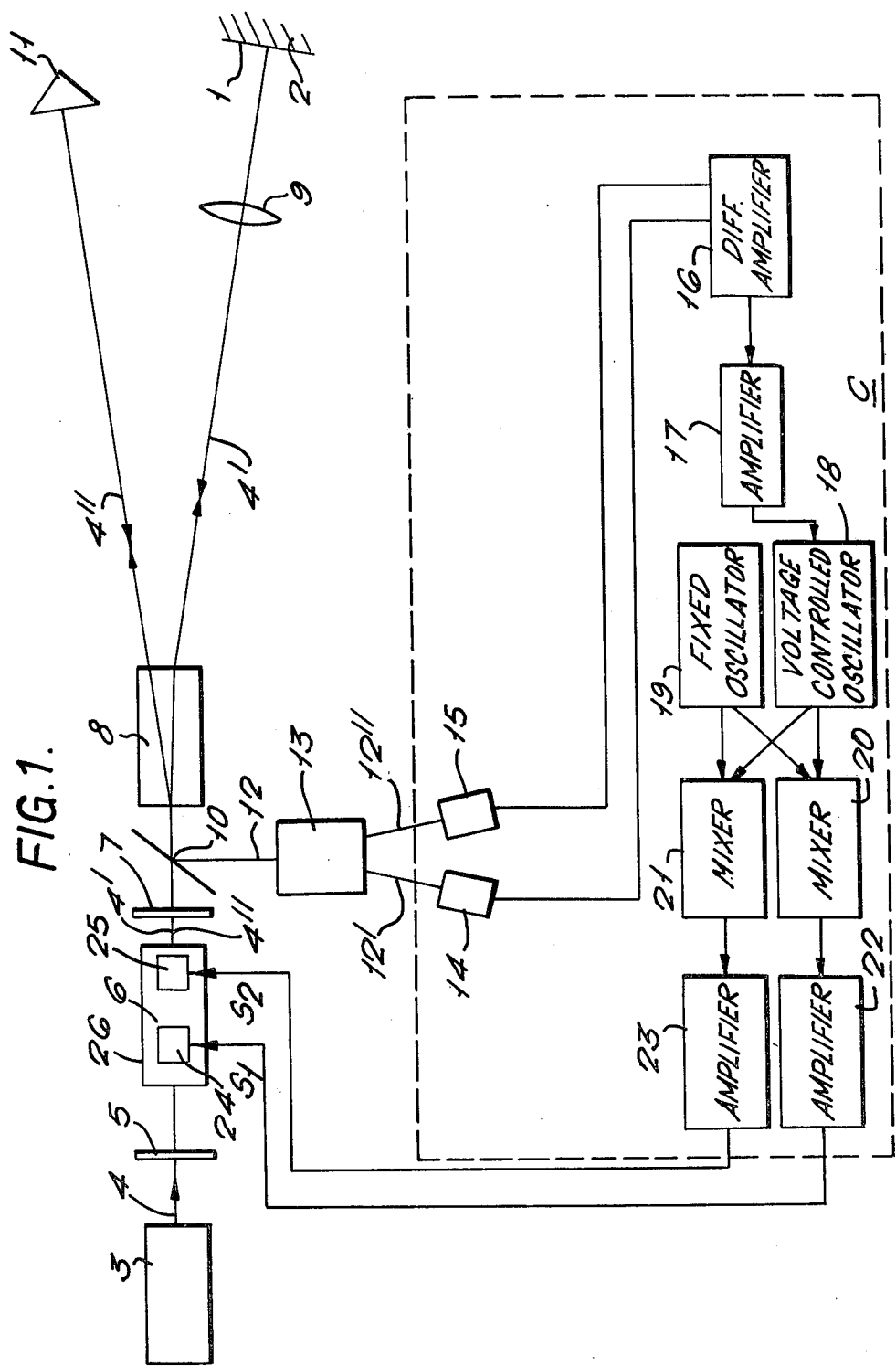
FIG. 1 is a diagrammatic representation of an embodiment of the invention.

Referring to FIG. 1, an interferometer for observing vibrations of a surface 1, which forms part of a structure 2, consists of a laser light source 3 which is arranged to produce a plane polarised beam of light 4. The beam of light 4 is incident upon a quarter wave plate 5 which changes the light from plane to circularly polarised. The now circularly polarised beam of light 4 is then incident upon an electro optical unit 6, which will be described later. The electro optical unit 6 produces two superimposed beams of light 4' and 4", each of which is circularly polarised but in opposite senses. One of the beams of light produced by the electro optical unit 6, say 4' has the same phase and sense of polarisation as the beam of light 4 which is incident upon the electro optical unit 6. The other beam of light, 4", is polarised in the opposite sense to the beam of light 4 which is incident upon the electro optical unit 6, and it also has a slightly different frequency. The change in frequency, which can be considered as a continuously varying phase change, is produced by control signals $S_1$, $S_2$ which are generated by a control loop C and applied to the electro optical unit 6. The beams of light 4' and 4" pass through another quarter wave plate 7 which converts them into plane polarised light, the beam of light 4' being polarised in the same plane as the original beam of light 4, and the beam of light 4" being polarised at right angles to the beam of light 4'. The beams of light 4', 4" are then separated spatially by a Wollaston prism 8. Alternatively, a Rochon prism or other polarising beam splitter can be used. The beam of light 4' is utilised to form the measuring arm of the interferometer and it is directed at the surface 1 the vibration of which is to be measured. The beam of light 4" is utilised to form the reference arm of the interferometer. The beam of light 4' is scattered, or reflected, by the surface 1, depending on its nature, and returns along a path parallel to but slightly below its original path. If the surface 1 is such as to scatter rather than reflect the beam of light 4', then a lens 9 is used to reform a parallel beam of light. The returning beam of light 4' passes through the Wollaston prism 8 and falls upon a plane mirror 10. Meanwhile the beam of light 4" is directed upon a corner cube 11 which returns it along a parallel but displaced path again passing through the Wollaston prism 8. A rotatable polarizer can be included in either the outward or return path of the beam of light 4" to enable its intensity to be matched to that of the returning beam of light. The arrangement is such that the returning beam of light 4" also is incident upon the mirror 10 and the beams of light 4'-, 4" are superimposed to form a single beam of light 12 which has two components which are polarised at right angles, to each other. Also, the optical path lengths of the beams of light 4' and 4" are made to be such that, nominally, conditions exist whereby interference could occur between the beams of light 4' and 4" after they have been combined by the Wollaston prism 8. However, because the two components of the beam of light 12 are polarised at right angles to each other, they do not interfere to produce intensity variations. The beam of light 12 is then incident upon a polarising beam splitter 13 which has its plane of polarisation at 45° to the planes of polarisation of the components of the beam of light 12. Thus each component of the beam of light 12 is resolved into two further components polarised at right angles to each other. Moreover, the further components will be grouped into two pairs of co-planar beams of light, and these will be able to combine and interfere to produce two final beams of light 12' and 12".

Each of the beams of light 12', 12" includes components derived from both the measuring and the reference arms of the interferometer 4' and 4", respectively, which can interfere in the normal way to indicate changes in the optical path length of the arms of the interferometer. The phase relationships are such that the constituents of beam 12" are in phase when those of beam 12' are anti phase, and vice versa. Thus when the beam of light 12' is at its maximum brightness the beam of light 12" is at its minimum brightness. The two beams of light 12' and 12" are incident upon two photomultipliers 14 and 15 respectively which form part of the control loop C. The photodetectors 14 and 15 are connected to a differential amplifier 16 which in turn is connected to another amplifier 17, and thence to a voltage controlled oscillator 18 which produce two output signals, in phase but with a frequency directly related to the output voltage of the amplifier 17. An oscillator 19 is arranged to produce two equal output signals having a phase difference of $\pi/2$. These signals are mixed with the signals from the voltage controlled oscillator 18 in two mixers 20 and 21 and the resultant signals are amplified in respective amplifiers 22 and 23 to provide the control signals $S_1$ $S_2$ for the electro optical unit 6.

The electro-optical unit 6 consists of two Kerr cells 24, 25 in a common envelope 26. The electrodes of the Kerr cell 24 are arranged to be at 45° to those of the Kerr cell 25. The control signal $S_1$ from the amplifier 22 is applied to the Kerr cell 24, and the control signal $S_2$ from the amplifier 23 is applied to the Kerr cell 25. The electro-optical unit 6 introduces an effective phase shift in the beam of light 4" passing through it which is related to the phase of the signals applied to the electro-optical unit 6.

The interferometer operates around a balanced condition in which the outputs from the two photomultipliers 14 and 15 are equal in amplitude. A small movement of the surface 1 results in a lack of balance in the photomultiplier outputs and hence the generation of a signal by the amplifiers 22 and 23, which control the phase shift introduced into the beam of light 4" which constitutes the reference arm of the interferometer, in the manner already described, so restoring the balanced condition of the interferometer. The characteristics of the control loop are such that it is more sensitive to the relatively low frequency, high amplitude component of the movement of the surface 1. Thus the control loop locks on to this component and automatically keeps the interferometer in a balanced condition.

The differential amplifier 16 is arranged to provide a signal which is indicative of the amplitude of the high frequency component of the vibration of the surface 1. The constant of proportionality between the high frequency displacements of the surface 1 and the signal from the differential amplifier 16 can be obtained in terms of the wavelength of the light used by running the interferometer out of lock and observing the peak-to-peak excursions at the signal from the differential amplifier 16. A signal indicative of the velocity of the low-frequency component of vibration of the surface 1 is also present and can be used if desired. Also, the low-frequency displacement of the surface 1 can be obtained to the nearest quarter-wavelength of the light used in the interferometer by counting the cycles of one or other of the control signals $S_1$ and $S_2$ which are applied to the electro-optical unit 6.

Figure 2:
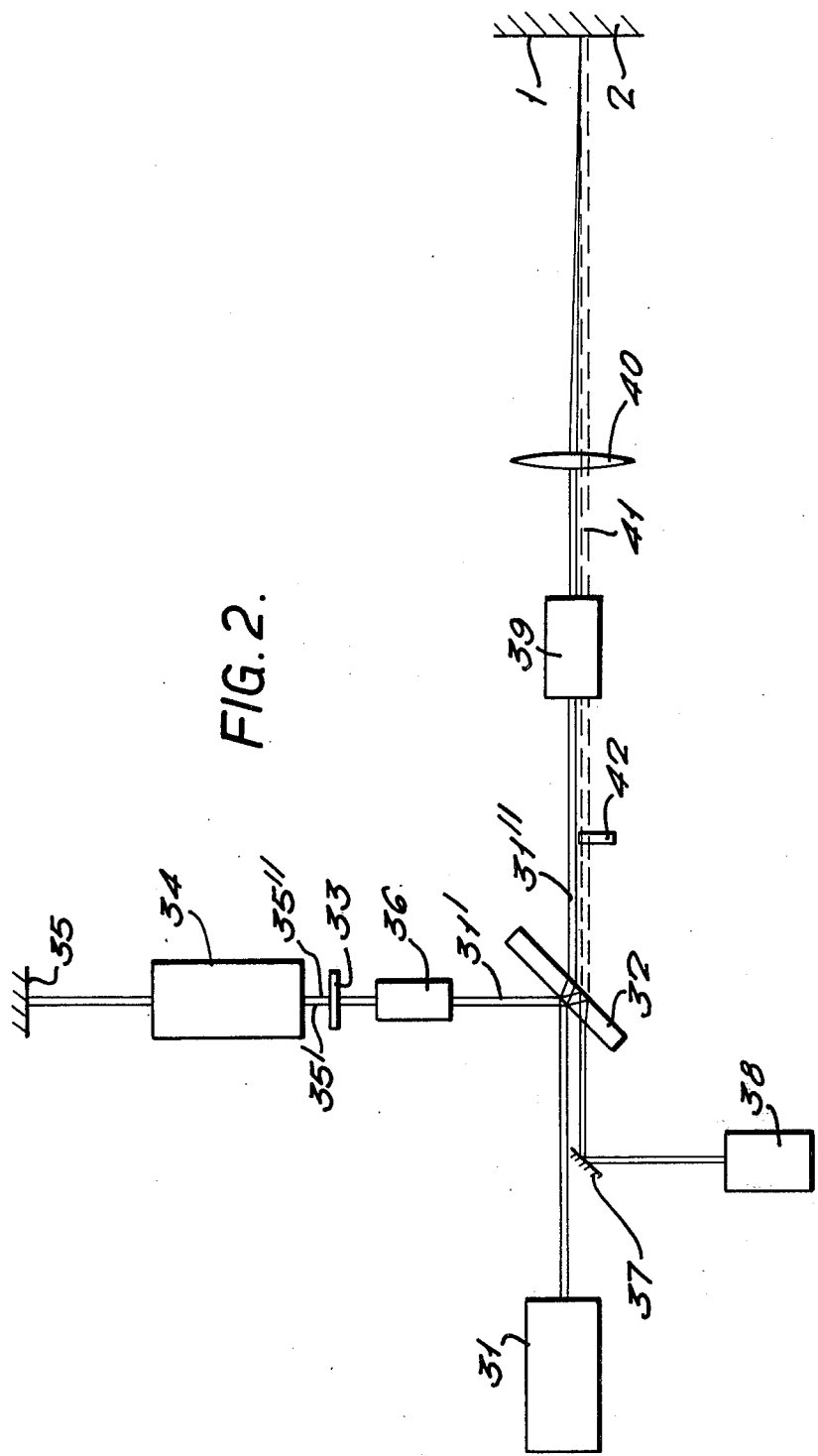
FIG. 2 is a diagrammatic representation of an optical system incorporated in another embodiment of the invention and, FIG. 3 is a diagrammatic representation of an optical system incorporated in a third embodiment of the invention.

FIG. 2 shows another optical system embodying the invention. A control loop identical to that already described is used, and hence it will not be described again. Referring to FIG. 2, plane-polarised light from a laser source 31 is split into two beams 31' and 31" by means of a glass plate beam splitter 32. The beam of light 31' is used to form the reference arm of an interferometer, and the beam of light 31" is used to form the measuring arm of the interferometer. The beam of light 31' passes through a Nicol prism 36 then through a quarter wave plate 33 which converts it to circularly polarised light and thence through an electro optical unit 34 identical to that used in the first embodiment of the invention. Light emerging from the electro-optical unit 34 is reflected back through the unit by a mirror 35. The net result of the double passage of the beam of light 31' through the electro optical unit 34 is to produce two superimposed beams of light 35', 35" one of which has the same direction of rotation and frequency as the circularly polarised portion of the beam of light 31' and the other of which has a different direction of rotation and frequency. The beams of light 35', 35" then pass back through the quarter wave plate 33 which converts them back to plane polarised light but of differing orientations. The two beams of light 35' 35" then pass through the Nicol prism 36 which is arranged to eliminate the beam of light which has the same frequency as the original beam of light. The surviving beam of light, 35" say, is reflected by the beam splitter 32 onto a mirror 37 and thence to a polarising beam splitter 38, as before. Meanwhile, the beam of light 31" emerges from the beam splitter 32, passes through a polariser 39 and is brought to a focus on the vibrating surface 1 by means of a lens 40. Light reflected, or scattered by the surface 1 is formed into a parallel beam 41 by the lens 40, passes back through the polariser 39 and then through a half wave plate 42 which is arranged that the plane of polarisation of the beam of light 41 is made to be perpendicular to that of the beam of light 35". The beam of light 41 then falls upon the beam splitter 32 which is so arranged that the beams of light 35" and 41 are combined before being reflected by the mirror 37 to the polarising beam splitter 38. As before, the two beams 35" and 41 do not interfere themselves but they may be separated into two interfering out-of-phase channels by the polarising beam splitter 38, as before.

Figure 3:
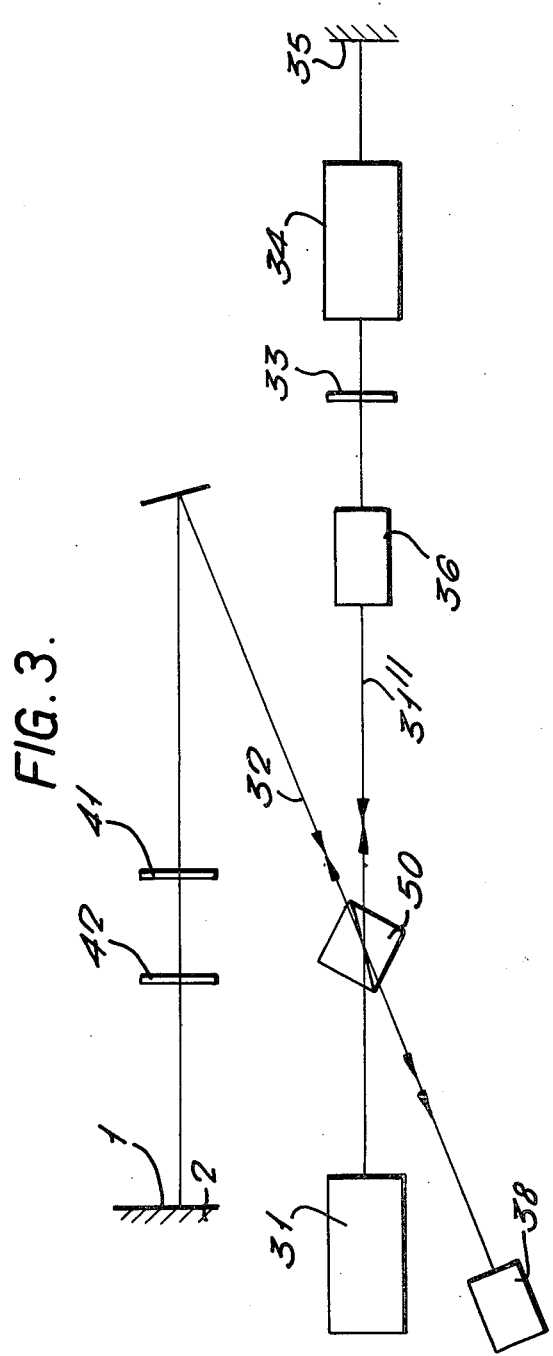

Referring to FIG. 3, there is shown another optical system in which the glass plate beam splitter 32 is replaced by a split-cube beam splitter 50. Also, the polariser 39 and half-wave plate 42 are replaced by a neutral density filter 43 and a quarter wave plate 44. The beam of light 31' which is utilised in the measuring arm of the interferometer is caused to make two passages through the quarter wave plater 44, thus it acts in the same manner as a half wave plate. The remainder of the embodiment is the same as that described with reference to FIG. 2, and the components are denoted by the same reference numerals.

I claim:

1. A metrological interferometer for investigating vibrations of a structure, comprising a reference arm and a measuring arm including a reflector adapted to form part of the structure, an electro-optical device adapted to produce from an input beam of monochromatic light two beams of light one of which has the same frequency and phase as the input beam and the other of which has a different frequency, the difference in frequency being governed by control signals, means for causing light of the orginal frequency to traverse one arm of the interferometer, means for causing light of the other frequency to traverse the other arm of the interferometer, a control loop comprising means for detecting cyclic changes in the optical path length of the measuring arm relative to that of the reference arm, means for producing a primary signal indicative of those changes within a predetermined frequency range, and means responsive to the primary signal to produce control signals such as to cause the electro-optical device to produce a frequency change in the beam of light of altered frequency such as to effectively vary the phase of the light traversing the reference arm so as to compensate for the effects of the said cyclic changes within the said frequency range.

2. An interferometer according to claim 1 wherein the electro-optical device is such as to produce from an input beam of light two output beams of light, one of which has the same frequency and phase as the input beam of light, and the other of which has a different frequency, the difference in frequency between the two output beams of light being governed by the control signals.

3. An interferometer according to claim 2 wherein the electro-optical device comprises two electro-optical units, as herein defined, positioned to interact sequentially upon the input beam of light with their operative principal axes inclined at 45° to each other when control signals having a phase difference of $\pi/2$ are applied to the electro-optical units and there is provided means for causing the input beam of light to be circularly polarised, and means for converting the resultant circularly polarised output beams into two plane polarised beams of light, the planes of polarisation being orthoganal.

4. An interferometer according to claim 3 wherein the electro-optical units are Kerr cells.

5. An interferometer according to claim 3 wherein the electro-optical units are Pockel cells.

6. An interferometer according to claim 1 wherein the electro-optical device is so positioned that light traverses it prior to being divided to form the reference and measuring arms of the interferometer.

7. An interferometer according to claim 6 wherein there is provided means for separating spatially the plane polarised output beams of light from the electro-optical device to form the reference and measuring arms of the interferometer, and means for superimposing the beams of light after they have traversed their respective paths.

8. An interferometer according to claim 7 wherein the means for separating spatially the reference and measuring beams of light comprises a polarising beam splitter.

9. An interferometer according to claim 8 wherein the polarising beam splitter is used to superimpose the two beams of light after they have traversed their respective paths.

10. An interferometer according to claim 8 wherein the polarising beam splitter comprises a Wollaston prism.

11. An interferometer according to claim 1 wherein there is provided means for generating two plane polarised coherent beams of light, one of which is utilised to form the reference arm of the interferometer and the other of which is utilised to form the measuring arm of the interferometer, and the electro-optical device is positioned in the reference arm of the interferometer.

12. An interferometer according to claim 11 wherein there is provided means for eliminating the output beam of light from the electro-optical device which has the same frequency and direction of polarisation as the beam of light forming the measuring arm of the interferometer, and means for superimposing the other beam of light with the beam of light forming the measuring arm of the interferometer after they have traversed their respective paths.

13. An interferometer according to claim 11 wherein the light forming the reference arm of the interferometer is caused to pass through the electro-optical device twice and the means for causing the input beam to the electro-optical device to be circularly polarised is also used to convert the output beams after their double passage through the electro-optical device into two orthoganally plane polarised beams of light.

14. The interferometer according to claim 12 wherein the light forming the reference arm of the interferometer is caused to pass through the electro-optical device twice and the means for causing the input beam to the electro-optical device to be circularly polarised is also used to convert the output beams after their double passage through the electro-optical device into two orthoganally plane polarised beams of light.

15. An interferometer according to claim 12 wherein the means for eliminating the output beam from the electro-optical device having the same frequency and plane as the light forming the measuring arm of the interferometer comprises a Nicol prism.

16. An interferometer according to claim 14 wherein the means for eliminating the output beam from the electro-optical device having the same frequency and plane as the light forming the measuring arm of the interferometer comprises a Nicol prism.

17. An interferometer according to claim 9 wherein there is provided a polarising beam splitter arranged to produce from the superimposed beams of light two final output beams each including components derived from both the reference and measuring arms of the interferometer, the phase relationships being such that one final output has a maximum intensity when the other has a minimum intensity and vice versa.

18. An interferometer according to claim 17 wherein the means for generating the primary signal comprises first and second photo detectors responsive to the first and second final output beams, respectively, a differential amplifier arranged to produce a signal representative of the difference in intensity between the first and second final output beams of light and a voltage-controlled oscillator arranged to produce two equal electrical signals the frequency of which is related to the amplitude of the signal from the differential amplifier.

19. An interferometer according to claim 18 wherein the means for deriving control signals from the primary signal comprises an oscillator arranged to produce two electrical signals having a phase difference of $\pi/2$, means for separately combining the signals from the said oscillator with those from the voltage-controlled oscillator, and means for separately amplifying the resultant signals to provide the control signals.

20. An interferometer according to claim 16 wherein there is provided means for counting the cycles of one or other of the control signals required to restore the two final output beams to a condition of equal intensity thereby to provide a measurement of the variations in the optical path length of the measuring arm of the interferometer.

21. A method of investigating vibrations of a structure comprising the steps of:
processing an input beam of monochromatic light with an electro-optical device to produce two beams of light, a first one of said beams having the same frequency and phase as the input beam, and a second one of said beams having a frequency different from that of the input beam, the difference in frequency being controllable by control signals applied to said electro-optical device;

causing one of said beams to traverse a reference arm of an interferometer and causing a second of said beams to traverse a measuring arm of said interferometer, said measuring arm including a reflector adapted to form a part of the structure;

detecting cyclic changes in the optical path length of said measuring arm relative to that of said reference arm;

producing a primary signal indicative of those of said changes within a predetermined frequency range; and producing control signals from said primary signal which cause said electro-optical device to produce a frequency change in said second beam of light such as to effectively vary the phase of the light traversing the reference arm so as to compensate for the effects of said cyclic changes within said frequency range.

* * * * *